A. L. KERBAUGH.
VALVE.
APPLICATION FILED OCT. 9, 1912.

1,087,021.

Patented Feb. 10, 1914.
2 SHEETS—SHEET 2.

Witnesses
Hugh H. Ott
John J. McCarthy

Inventor
Arthur L. Kerbaugh
By Victor J. Evans
Attorney

UNITED STATES PATENT OFFICE.

ARTHUR L. KERBAUGH, OF ALLENTOWN, PENNSYLVANIA.

VALVE.

1,087,021.  Specification of Letters Patent.  Patented Feb. 10, 1914.

Application filed October 9, 1912. Serial No. 724,845.

*To all whom it may concern:*

Be it known that I, ARTHUR L. KERBAUGH, a citizen of the United States, residing at Allentown, in the county of Lehigh and State of Pennsylvania, have invented new and useful Improvements in Valves, of which the following is a specification.

This invention relates to improvements in valves and has particular application to globe valves. It is to be understood, however, that the invention in its useful application is not limited to any particular type of valve structure.

In carrying out the present invention, it is my purpose to provide a valve structure wherein a fluid tight joint will be formed between the valve and its seat in the closed position of the valve and wherein dirt, grit and similar foreign matter will be effectively removed from the valve seat in the movement of the valve to closed position, thereby minimizing regrinding of the valve seat and other like repairs.

It is also my purpose to provide a construction of valve wherein the seat, when worn or otherwise fractured may be readily removed and repaired or replaced.

Furthermore, I aim to provide a valve which, when moved to closed position, will enter the seat and snugly engage the inner wall thereof with the effect to produce a fluid tight joint of maximum efficiency and at the same time remove scale or other matter which may tend to adhere to the wall of the seat.

A further object of the invention is the provision of a valve which may be moved into and out of the seat to close and open the valve respectively and which will be constructed in such manner that the elements forming the valve proper may have relative movement to insure a fluid tight joint.

With the above and other objects in view, the invention consists in the construction, combination and arrangement of parts hereinafter set forth in and falling within the scope of the claims.

Figure 1:
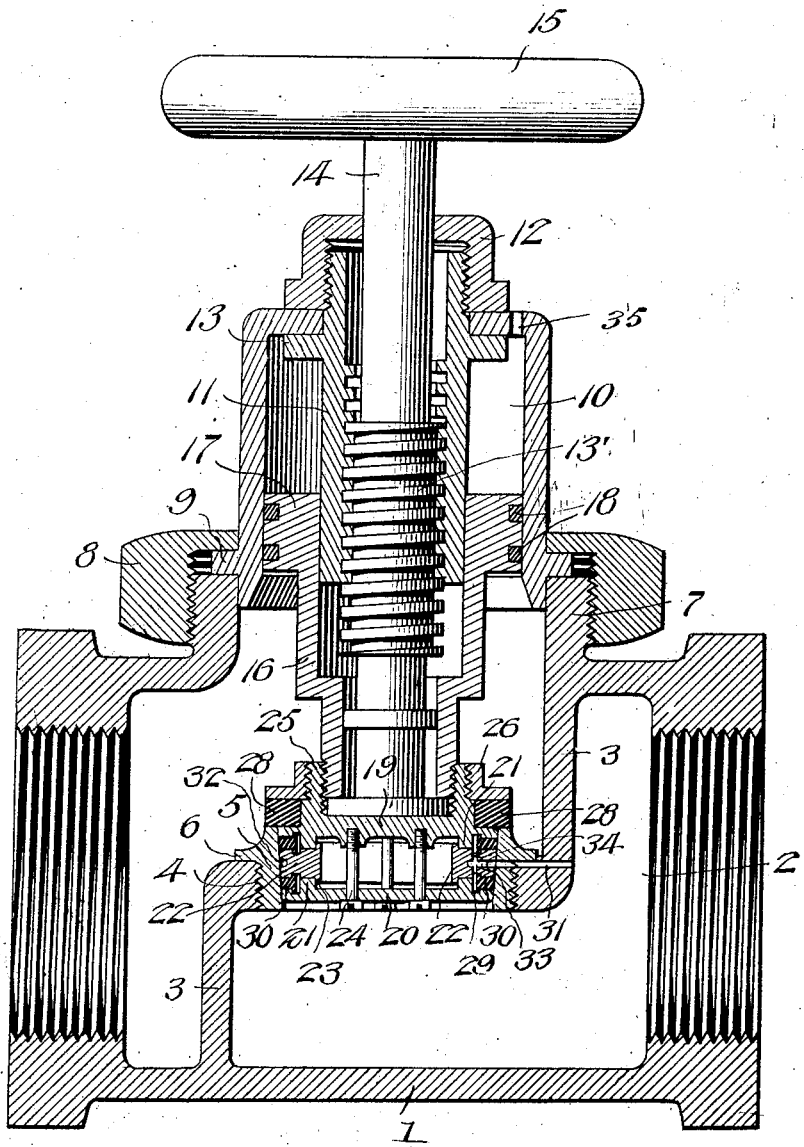
Figure 2:
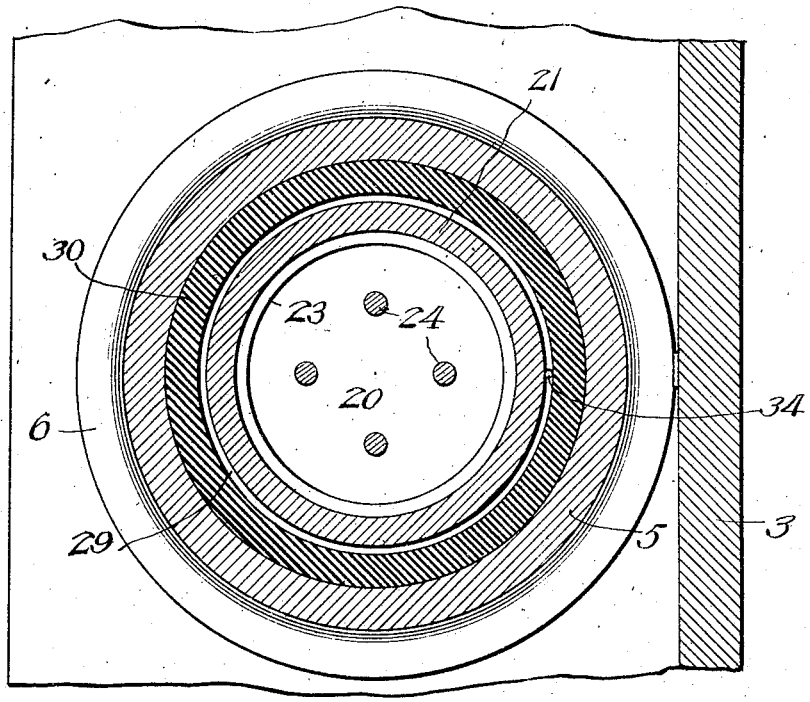
Figure 3:
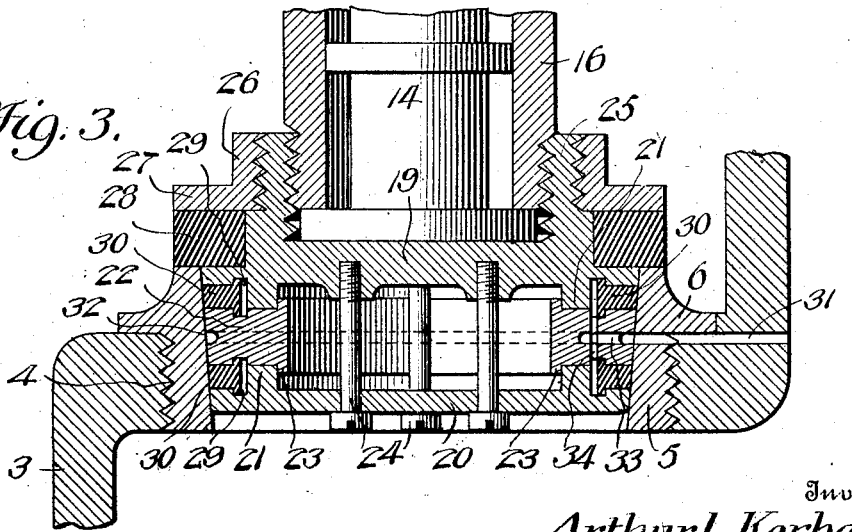

In the accompanying drawings: Figure 1 is a vertical sectional view through a globe valve constructed in accordance with the present invention. Fig. 2 is a horizontal sectional view through the same, and Fig. 3 is an enlarged fragmentary sectional view through the valve proper and its seat.

In the present instance, I have shown my invention as applied to the globe valve covered by my Patent Number 974,498. It is conceivable, however, that my improvements, in their useful application, are not limited to this specific form of valve construction and I, therefore, do not confine myself to the precise details of construction herein described and delineated, as modification and variation may be made within the scope of my claims and without departing from the spirit of the invention.

Referring now to the accompanying drawings in detail, the numeral 1 indicates a valve casing having the fluid passage 2 therethrough and provided with the usual partition 3 therein. This partition 3 has formed in its longitudinal portion a threaded opening 4 designed to receive a ring 5 forming the valve seat and provided with a circumferentially extending flange 6 snugly engaging one wall of the horizontal portion of the partition. The inner wall of the ring 5 is tapered downwardly as clearly illustrated in Fig. 3 of the drawings for a purpose which will presently appear.

The casing 1 is open above the valve seat and, in the present instance, is provided with a threaded extension 7 designed to receive a cap or nut 8, the latter clamping an annular flange 9 formed on and adjacent to the lower end of a hood 10, the flange 9 resting upon the end wall of the threaded extension 7. This hood or bonnet 10 may be of any desired contour in cross section and has formed in the free end thereof an opening to receive the upwardly projecting end of a barrel 11, said end being projected beyond the hood and is screw threaded to receive a cap 12, the latter clamping the hood and coöperating with a flange 13 formed on the barrel immediately below the upper end of the hood, to securely hold the barrel in position.

The barrel 9 is internally screw threaded for a portion of its length to receive the threaded portion 13′ of a valve stem 14, one end of the latter extending outwardly of the cap 10 and beyond the hood and is provided with any suitable form of manipulating device 15, shown in the present instance, to be a hand wheel. The numeral 16 indicates a cylinder which is of two diameters as shown, the upper or larger diameter being mounted to slide on the barrel 9 and is formed with an integral piston or ring 17 having suitable circumferential packing rings 18. The piston 17 is designed to move between the barrel and the hood, while the packing rings serve to form a fluid tight joint between the upper and lower portions of the hood or bonnet 10, thereby preventing the passage of steam, water or other fluid past the piston.

The construction thus described is identical to that disclosed in my former patent hereinbefore referred to and forms no part of the present invention. In accordance with the present invention, the valve proper is movable into and out of the ring constituting the valve seat and is constructed in such manner as to be capable of expansion to engage the inner wall of the seat, thus insuring a fluid tight joint when the valve is closed. The valve, in the present instance, is composed of a pair of disks 19, 20 each formed on one face with an annular flange 21 extending toward the flange on the opposite disk and spaced apart therefrom to receive an annulus 22 having formed on its inner circumferential edges flanges 23, 23 designed to engage the adjacent portions of the flanges 21 whereby accidental displacement of the annulus is avoided, bolts or the like 24 being passed through the disks 19, 20 to clamp the annulus 22 in place and hold said disks and annulus assembled. Extending outwardly from the face of the disks 19 opposite from the flange 21 is a nipple 25 threaded interiorly to engage the outer wall of the smaller diameter of the cylinder 16, and threaded exteriorly to receive a ring 26 provided with a circumferentially extending flange 27 coöperating with the adjacent portion of the disk 19 to receive a packing ring 28, the latter being designed to engage the upper edge of the ring forming the valve seat, in the closed position of the valve. The confronting portions of the disks 19, 20 and the annulus 22 are provided with alining circumferentially extending grooves 29 to receive the flanged edges of packing rings 30, 30 disposed concentrically of the flanges 21, 21 and capable of expansion or movement relatively to the disks and the annulus 22. In the present instance, these packing rings 30, 30 are expanded under the action of the fluid on one side of the partition 3 when the valve is closed and for this purpose, the longitudinal portion of the partition and the ring 5 forming the valve seat are provided with registering bores forming a fluid port 31 communicating with an annular groove 32 formed in the outer wall of the annulus 22, the groove 32 communicating with the spaces between the flanges 21 and the packing rings 30 by way of a port 33 and lateral bores 34, 34 formed in the annulus 22. The outer annular sides of the various elements, comprising the valve, which enter the seat are tapered to conform to the similar configuration of the inner wall of the seat so as to enable the rings 30, 30, to enter and leave the seat with ease and facility and without binding in the movement of the valve to closed position.

From the foregoing description taken in connection with the accompanying drawings, the construction and mode of operation of my invention will be readily apparent.

It will be seen that when the valve is disposed within the seat to close the passage 2, as clearly illustrated in Fig. 3 of the drawings, the fluid within the casing 1 will pass through the ports 31 and 33 and behind the packings 30, 30 by way of lateral ports 34 communicating with the port 33, thereby expanding the packings 30, 30 and producing a binding action between the same and the inner wall of the valve seat, thus producing an effective fluid tight joint, the grooves 29 limiting the outward movement of the packing rings 30, 30, incident to the flanged edges of such rings being disposed within said grooves. It will also be noted that the groove 32 establishes communication between the ports 31 and 33, irrespective of the relative positions of such ports, while the packing ring 28 coöperates with the rings 30, 30 to seal the passage 2. When the stem 14 is rotated in one direction or the other, the cylinder 16 and the valve connected thereto will be moved either toward or away from the seat, while the barrel 11 remains stationary at all times, the cylinder 16 moving between the barrel and hood or bonnet. Thus, contact between the threads on the valve stem and the steam, water or other fluid is avoided thereby eliminating mutilation of the screw threads.

As in my former patent, the hood or bonnet 10 is equipped with a vent aperture 35 to permit free movement of the piston and eliminate the compression of air or partial vacuum which might otherwise be caused by the piston in its movement.

In order to increase the area of the fluid passage 2 in the valve casing 1 so that the maximum volume of the fluid may pass through the valve casing when the valve is open, I form the casing with a drop bottom 36 disposed in a plane below the inlet opening of the valve casing and the valve seat.

I claim:

1. In combination, a valve casing having a fluid passage therethrough, a valve seat in said casing provided with a port, a partition supporting said valve seat and formed with a port registering with the port in said seat, a valve movable into and out of said seat to close and open said passage, said valve comprising a pair of disks provided with oppositely disposed flanges, an annulus interposed between the flanges on said disks and formed with a port adapted to register with the first-named port, packing rings surrounding said flanges at the opposite sides of said annulus and adapted to be expanded against the inner wall of said seat under the action of the fluid when the ports register one with the other in the closed position of the valve, a nipple on one of said disks, a ring threaded onto said nipple, and a packing ring interposed between the ring on said nipple and the adjacent portion of the disk and designed to engage the upper edge of the valve seat.

2. In combination, a valve casing having a fluid passage therethrough, a valve seat in said casing provided with a port, a partition supporting said valve seat and formed with a port registering with the port in said seat, a valve movable into and out of said seat to close and open said passage, said valve comprising a pair of disks provided with oppositely disposed flanges, an annulus interposed between the flanges on said disks and provided with a port adapted to register with the first-mentioned port, and packing rings surrounding said flanges at the opposite side of said annulus and adapted to be expanded against the inner wall of said seat under the action of the fluid when the ports register one with the other in the closed position of the valve.

3. In combination, a valve casing having a fluid passage therethrough, a valve seat in said casing, a valve movable into and out of said seat to open and close said passage, a nipple on said valve, a ring threaded onto said nipple, and a packing ring interposed between the ring on said nipple and the adjacent portion of the valve and designed to engage the upper edge of the valve seat and coöperating with said valve to form a fluid tight joint.

In testimony whereof I affix my signature in presence of two witnesses.

ARTHUR L. KERBAUGH.

Witnesses:
O. B. J. HAINES,
GERTRUDE A. JACOBY.